(12) United States Patent
Butzen et al.

(10) Patent No.: US 9,132,492 B2
(45) Date of Patent: Sep. 15, 2015

(54) RECIPROCATING SAW BLADE

(75) Inventors: Robert W. Butzen, Colgate, WI (US);
Ryan J. Malloy, Milwaukee, WI (US);
Andrew J. Schulz, Slinger, WI (US);
Austin J. Kazda, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 320 days.

(21) Appl. No.: 13/567,665

(22) Filed: Aug. 6, 2012

(65) Prior Publication Data

US 2013/0032016 A1 Feb. 7, 2013

Related U.S. Application Data

(60) Provisional application No. 61/515,125, filed on Aug. 4, 2011.

(51) Int. Cl.
*B23D 61/12* (2006.01)

(52) U.S. Cl.
CPC ........... *B23D 61/125* (2013.01); *Y10T 83/0524* (2015.04); *Y10T 83/9454* (2015.04)

(58) Field of Classification Search
USPC .......... 83/835, 699.21, 838; 30/349, 355, 337
See application file for complete search history.

(56) References Cited

U.S. PATENT DOCUMENTS

| | | | |
|---|---|---|---|
| 1,181,529 A * | 5/1916 | Hutton | 83/838 |
| 3,946,778 A * | 3/1976 | Knuth | 30/501 |
| 6,401,585 B1 * | 6/2002 | Morgan | 83/835 |
| 2004/0139617 A1* | 7/2004 | Neshat et al. | 30/355 |
| 2010/0218389 A1* | 9/2010 | Kalomeris et al. | 30/392 |

* cited by examiner

*Primary Examiner* — Stephen Choi
(74) *Attorney, Agent, or Firm* — Michael Best & Friedrich LLP (57) ABSTRACT

A saw blade for use with a reciprocating saw includes a first section having an attachment portion configured to engage the reciprocating saw. The saw blade also includes a second section having a body coupled to the first section, a cutting portion formed on the body, and an attachment portion configured to engage the reciprocating saw. The first and second sections are usable together with the reciprocating saw as a single saw blade. The second section is separable from the first section such that the second section is usable with the reciprocating saw independently of the first section.

12 Claims, 7 Drawing Sheets

RECIPROCATING SAW BLADE

CROSS-REFERENCE TO RELATED APPLICATIONS

This application claims priority to U.S. Provisional Patent Application No. 61/515,125, filed Aug. 4, 2011 by Robert W. Butzen et al. and titled "RECIPROCATING SAW BLADE," the entire contents of which are incorporated by reference herein.

BACKGROUND

The present invention relates to saw blades and, more particularly, to saw blades for use with reciprocating saws.

Saw blades, such as reciprocating saw blades, are used for cutting wood, metal, plastics, and other materials. A saw blade typically includes a body, an attachment portion, and a cutting portion. The cutting portion includes a plurality of teeth made up of one or more tooth forms. Overtime, the cutting portion may become worn from repeated use. However, the cutting portion of a saw blade typically wears unevenly such that only one section of the cutting portion becomes worn and dull, while another section of the cutting portion remains relatively sharp and still usable.

SUMMARY

In one embodiment, the invention provides a saw blade for use with a reciprocating saw. The saw blade includes a first section having an attachment portion configured to engage the reciprocating saw. The saw blade also includes a second section having a body coupled to the first section, a cutting portion formed on the body, and an attachment portion configured to engage the reciprocating saw. The first and second sections are usable together with the reciprocating saw as a single saw blade. The second section is separable from the first section such that the second section is usable with the reciprocating saw independently of the first section.

In another embodiment, the invention provides a saw blade for use with a reciprocating saw. The saw blade includes a first section having a body, a cutting portion formed on the body, and an attachment portion configured to engage the reciprocating saw. The saw blade also includes a second section having a body, a cutting portion formed on the body, and an attachment portion configured to engage the reciprocating saw. The saw blade further includes a connecting member coupling the first section to the second section so that the first and second sections are usable together with the reciprocating saw as a single saw blade. The second section is disconnectable from the connecting member to separate the second section from the first section such that the second section is usable with the reciprocating saw independently of the first section.

In yet another embodiment, the invention provides a method of using a saw blade with a reciprocating saw. The method includes providing a saw blade having a first section and a second section. The first section has an attachment portion. The second section has a body coupled to the first section, a cutting portion formed on the body, and an attachment portion. The method also includes connecting the attachment portion of the first section to the reciprocating saw to use the first and second sections together as a single saw blade, disconnecting the attachment portion of the first section from the reciprocating saw, separating the second section from the first section, and connecting the attachment portion of the second section to the reciprocating saw to use the second section independently of the first section.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

FIGS. 1-4 illustrate a saw blade 10 according to one embodiment of the invention. The illustrated saw blade 10 is a reciprocating saw blade for use with a power tool such as, for example, a reciprocating saw. The saw blade 10 includes two discrete saw blade sections 14, 18 that may be separated from each other to increase the usable life of the blade 10. Initially, the saw blade sections 14, 18 are secured together and connected to a reciprocating saw as a single saw blade. When one of the saw blade sections (e.g., the first saw blade section 14) becomes worn, that saw blade section may be disconnected from the other saw blade section (e.g., the second saw blade section 18) and discarded. The other saw blade section may then be reconnected to the reciprocating saw and used in a conventional manner. By removing one of the saw blade sections, the worn area of the blade 10 may be completely removed and discarded, or the cutting zone of the saw blade 10 (relative to an end or shoe of the reciprocating saw) may be moved away from the worn area of the blade 10.

In the illustrated embodiment, each saw blade section 14, 18 includes a body 22, 26, an attachment portion 30, 34 for coupling the saw blade 10 to a reciprocating saw, and a cutting portion 38, 42 having a plurality of cutting teeth 46. Each body 22, 26 includes a first end portion 50, 54 and a second end portion 58, 62. The first end portion 50 of the first saw blade section 14 is connected to the second end portion 62 and the attachment portion 34 of the second saw blade section 18. The first end portion 54 of the second saw blade section 18 forms a tip portion 66 of the saw blade 10.

The first attachment portion 30 is coupled to (e.g., formed at) and extends from the second end portion 58 of the first saw blade section 14. The second attachment portion 34 is coupled to (e.g., formed at) and extends from the second end portion 62 of the second saw blade section 18. Each attachment portion 30, 34 includes a tang 70, 74 and defines an aperture 78, 82. The tangs 70, 74 and the apertures 78, 82 are configured to engage a blade clamp of a reciprocating saw to securely and releasably couple the saw blade 10 to the saw. In addition, the tang 74 of the second saw blade section 18 is directly connected to the first end portion 50 of the first saw blade section 14.

The cutting teeth 46 are formed along a cutting edge 86 of the saw blade 10 to define a tooth form. The cutting edge 86 extends continuously from the first end portion 54 of the second saw blade section 18 to the second end portion 58 of the first saw blade section 14. In the illustrated embodiment, the cutting teeth 46 are generally uniformly shaped and evenly spaced along the cutting edge 86. In other embodiments, the shape and/or spacing of the cutting teeth 46 may vary along the cutting edge 86. In further embodiments, the saw blade 10 may include other tooth forms.

Figure 1:
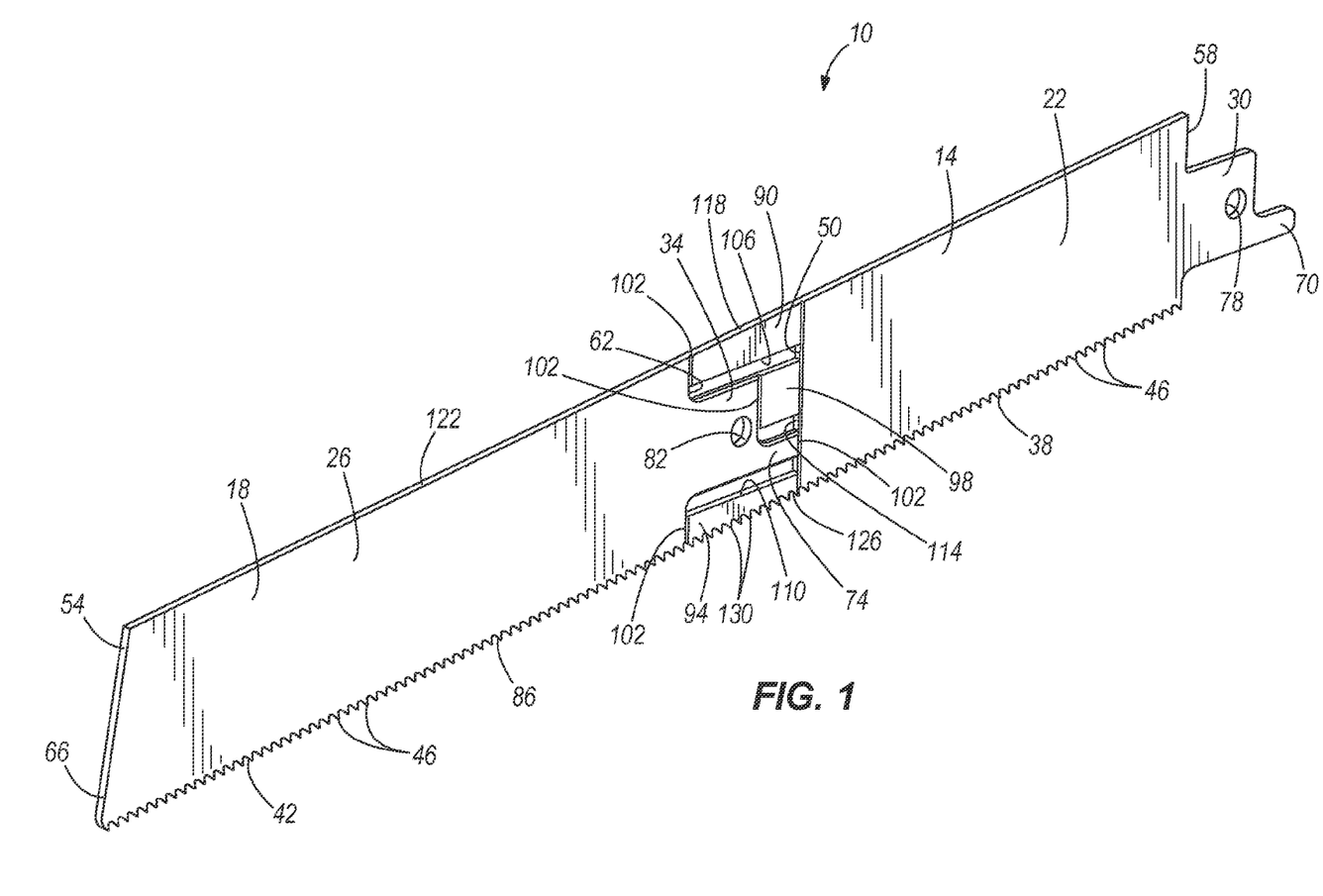
FIG. 1 is a perspective view of a saw blade according to one embodiment of the invention.
Figure 2:
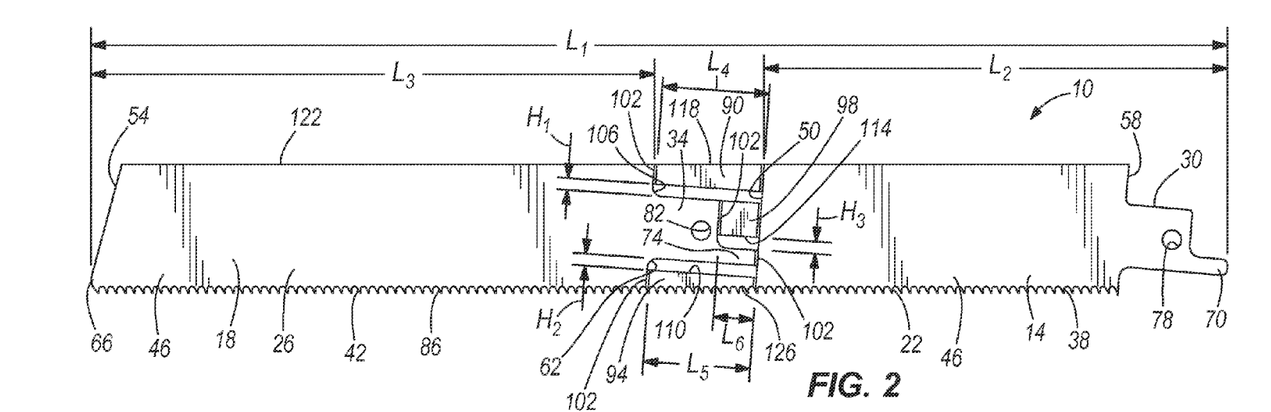
FIG. 2 is a side view of the saw blade shown in FIG. 1.

The two saw blade sections 14, 18 are connected together to form the single, unitary saw blade 10 shown in FIGS. 1 and 2. Referring to FIG. 2, the illustrated saw blade 10 has an overall length $L_1$ measured generally parallel to the cutting edge 86. Similarly, each saw blade section 14, 18 has a length $L_2$, $L_3$ measured generally parallel to the cutting edge. In some embodiments, the length $L_2$ of the first saw blade section 14 may be approximately 40% of the overall length $L_1$ of the saw blade 10. For example, in the illustrated embodiment, the overall length $L_1$ of the saw blade 10 is approximately 9 inches and the length $L_2$ of the first saw blade section 14 is between approximately 3.6 inches and approximately 3.7 inches. In other embodiments, the overall length $L_1$ of the saw blade 10 and/or the length $L_2$ of the first saw blade section 14 may be relatively longer or shorter such that the first saw blade section length $L_2$ is a larger or smaller percentage of the overall saw blade length $L_1$.

The length $L_2$ of the first saw blade section 14 relative to the overall length $L_1$ of the saw blade 10 may vary depending on the material the saw blade 10 is designed to cut. For example, in embodiments where the saw blade 10 is used to cut relatively small diameter or thin materials, the cutting teeth 46 near the attachment portion 30 of the first saw blade section 14 will wear more quickly than the cutting teeth 46 further from the attachment portion 30. In such embodiments, the length $L_2$ of the first saw blade section 14 may be relatively shorter (and the length $L_3$ of the second saw blade section 18 may be relatively longer) such that the second attachment portion 34 is spaced closer to the first attachment portion 30. In embodiments where the saw blade 10 is used to cut relatively large diameter or thick materials, some of the cutting teeth 46 further from the attachment portion 30 of the first saw blade section 14 will also wear relatively quickly. In such embodiments, the length $L_2$ of the first saw blade section 14 may be relatively longer (and the length $L_3$ of the second saw blade section 18 may be relatively shorter) such that the second attachment portion 34 is spaced further from the first attachment portion 30.

Figure 3:
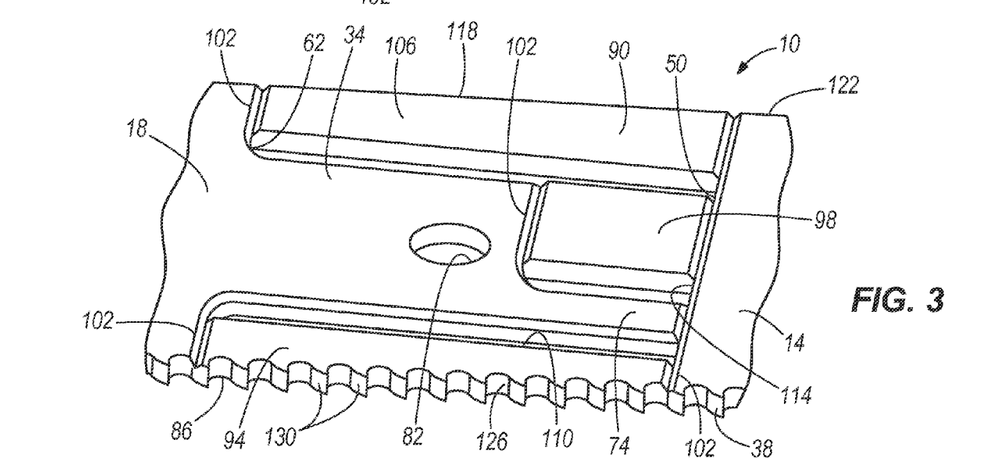
FIG. 3 is an enlarged view of a portion of the saw blade shown in FIG. 1.
Figure 4:
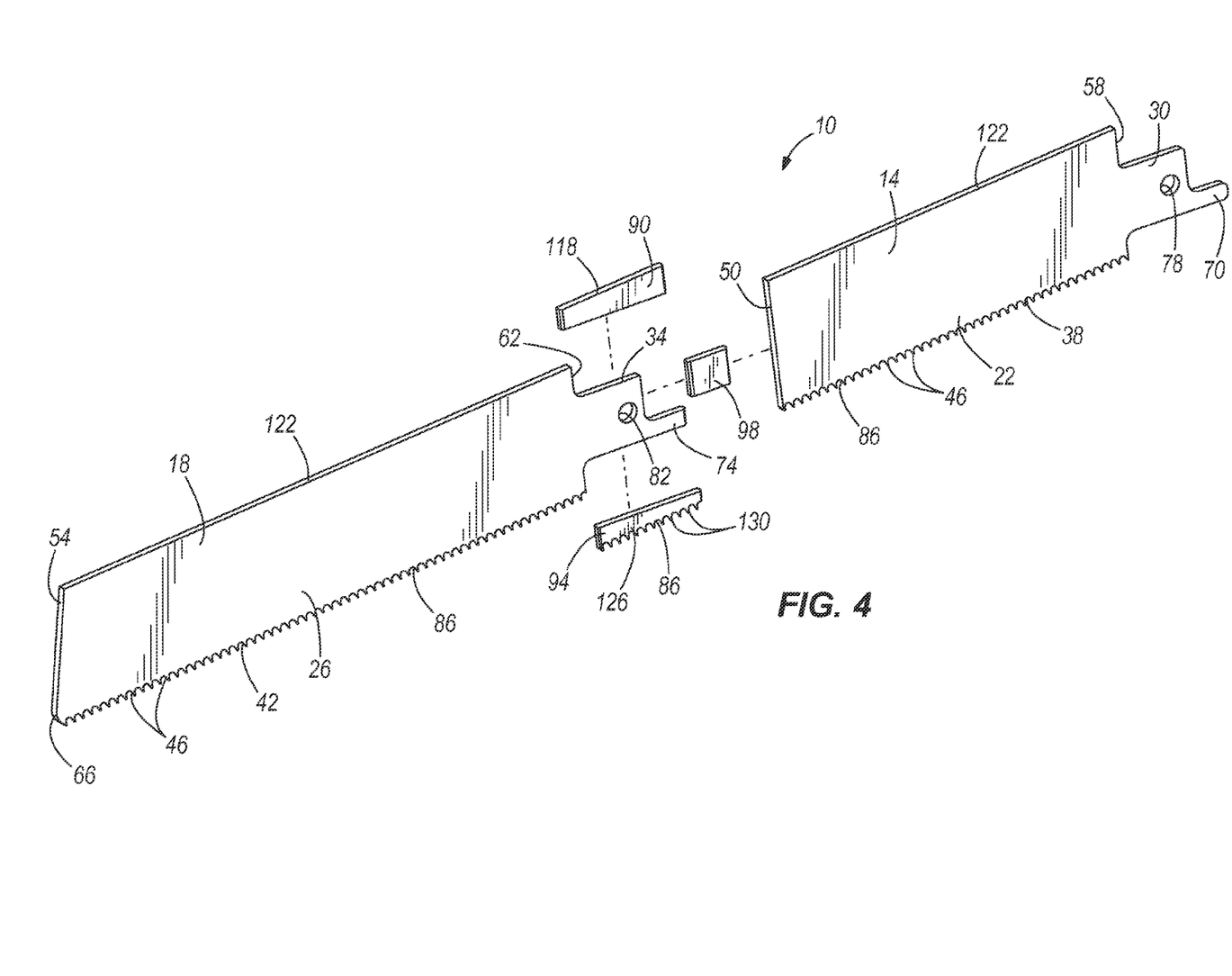
FIG. 4 is an exploded perspective view of the saw blade shown in FIG. 1.

Referring to FIGS. 3 and 4, the first saw blade section 14 and the second saw blade section 18 are connected together by three connecting members 90, 94, 98. In other embodiments, the saw blade sections 14, 18 may be connected together by fewer or more connecting members. The connecting members 90, 94, 98, along with the second attachment portion 34, are formed in the saw blade 10 during manufacture to facilitate connecting and separating the saw blade sections 14, 18. In the illustrated embodiment, grooves 102 and openings 106, 110, 114 are stamped into the saw blade 10 to define the connecting members 90, 94, 98, and thereby the first and second saw blade sections 14, 18. The grooves 102 reduce the thickness of the saw blade 10 at specified locations to facilitate snapping the connecting members 90, 94, 98 apart from the saw blade sections 14, 18. The illustrated grooves 102 are formed on one side or face of the saw blade 10, but may alternatively be formed on both sides of the blade 10. The openings 106, 110, 114 remove some of the blade material between the saw blade sections 14, 18 to further facilitate separating the sections 14, 18.

The illustrated first connecting member 90 extends between the first end portion 50 of the first saw blade section 14 and the second end portion 62 of the second saw blade section 18. The first connecting member 90 includes an edge 118 that is generally inline with a back edge 122 of the saw blade 10 to maintain the back edge 122 as a continuous, straight edge between the first saw blade section 14 and the second saw blade section 18. The first opening 106 is formed between the first connecting member 90 and the attachment portion 34 of the second saw blade section 18. In the illustrated embodiment, the first opening 106 has a length $L_4$, measured generally parallel to the tang 74, between approximately 0.83 inches and approximately 0.85 inches, and has a height $H_1$ between approximately 0.07 inches and approximately 0.09 inches. In other embodiments, the length $L_4$ and/or the height $H_1$ of the opening 106 may be relatively larger or smaller.

The second connecting member 94 also extends between the first end portion 50 of the first saw blade section 14 and the second end portion 62 of the second saw blade section 18. The second connecting member 94 includes an edge 126 that is generally inline with the cutting edge 86 of the saw blade 10 to maintain the cutting edge 86 as a continuous, straight edge between the first saw blade section 14 and the second saw blade section 18. Cutting teeth 130 are formed along the edge 126 of the second connecting member 94 to also maintain the tooth form of the saw blade 10. In some scenarios, the cutting teeth 130 on the second connecting member 94 may form the primary cutting surface of the saw blade 10. The second opening 110 is formed between the second connecting member 94 and the attachment portion 34 of the second saw blade section 18. In the illustrated embodiment, the second opening 110 has a length $L_5$, measured generally parallel to the tang 74, between approximately 0.83 inches and approximately 0.85 inches, and has a height $H_2$ between approximately 0.07 inches and approximately 0.09 inches. In other embodiments, the length $L_5$ and/or the height $H_2$ of the opening 110 may be relatively larger or smaller.

The third connecting member 98 extends between the first end portion 50 of the first saw blade section 14 and the attachment portion 34 of the second saw blade section 18. The third opening 114 is formed between the third connecting member 98 and the tang 74 of the second saw blade section 18. In the illustrated embodiment, the third opening 114 has a length $L_6$, measured generally parallel to the tang 74, between approximately 0.30 inches and approximately 0.32 inches, and a height $H_3$ between approximately 0.08 inches and approximately 0.10 inches. In other embodiments, the length $L_6$ and/or the height $H_3$ of the opening 114 may be relatively larger or smaller.

In operation, the attachment portion 30 of the first saw blade section 14 is connected to a reciprocating saw such that the entire saw blade 10 is initially used as a single unit to cut a work piece. When the cutting portion 38 of the first saw blade section 14 becomes worn or dull, the saw blade 10 is disconnected from the reciprocating saw. The saw blade sections 14, 18 are then separated from each other by snapping off the connecting members 90, 94, 98. For example, a user may bend or flex the saw blade sections 14, 18 relative to each other until the connecting members 90, 94, 98 break off of the second end portion 62 of the second saw blade section 18. As mentioned above, the second connecting member 94 may form the primary cutting surface of the saw blade 10 such that removing the member 94 may also remove the worn area of the blade 10. Once separated, the attachment portion 34 of the second saw blade section 18 is connected to the reciprocating saw independently of the first saw blade section 14 for use as a smaller (e.g., shorter) version of the saw blade 10. The second saw blade section 18 provides a relatively fresh cutting portion 42, or cutting zone, to continue cutting the work piece.

Figure 5:
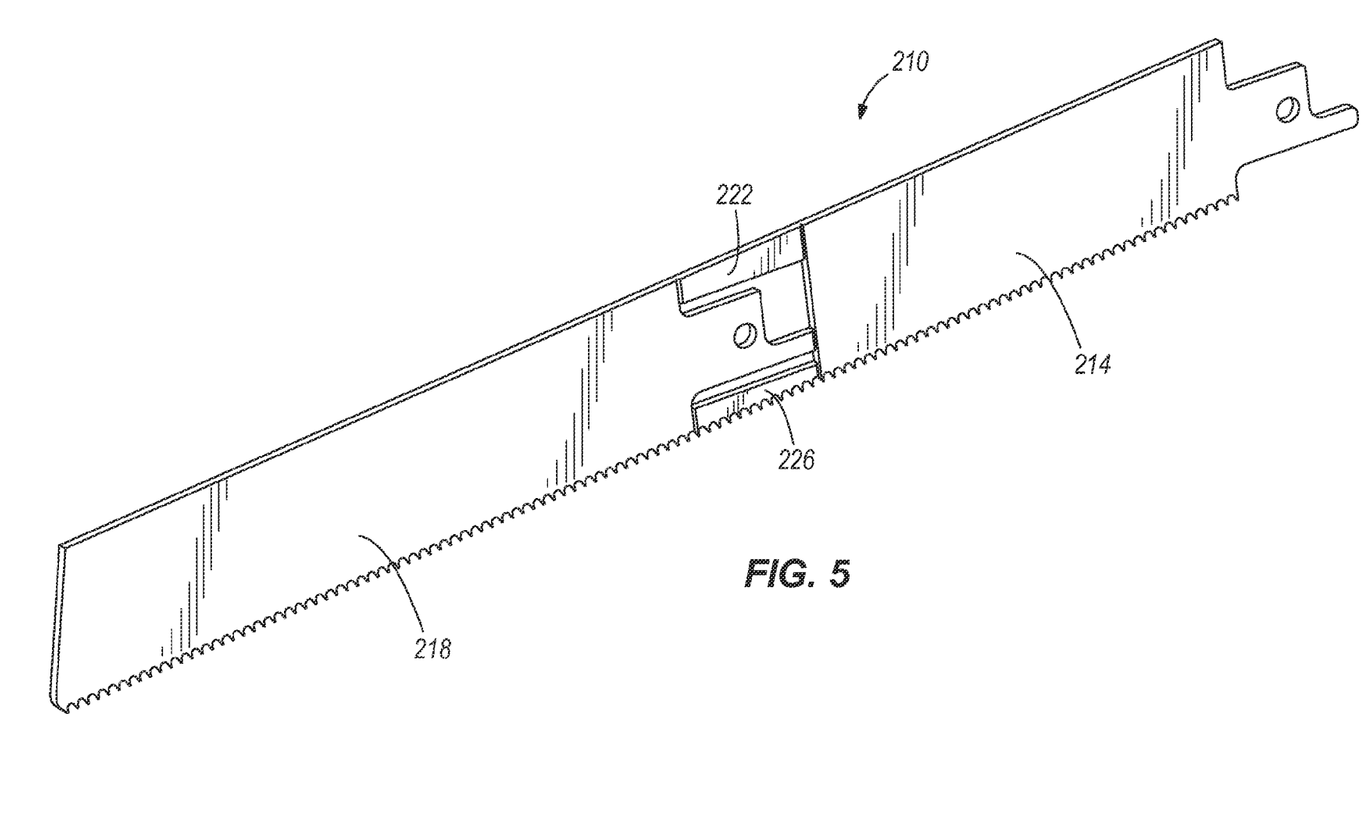
FIG. 5 is a perspective view of a saw blade according to another embodiment of the invention.

FIG. 5 illustrates another embodiment of a saw blade 210 for use with a reciprocating saw. The illustrated saw blade 210 is similar to the saw blade 10 discussed above and includes two saw blade sections 214, 218 connected together by connecting members 222, 226. In the illustrated embodiment, the saw blade 210 only includes two connecting members 222, 226 that extend between and connect the saw blade sections 214, 218. Such an arrangement facilitates separating the saw blade sections 214, 218 by reducing the total number of pieces that need to be snapped off of the second saw blade section 218.

Figure 6:
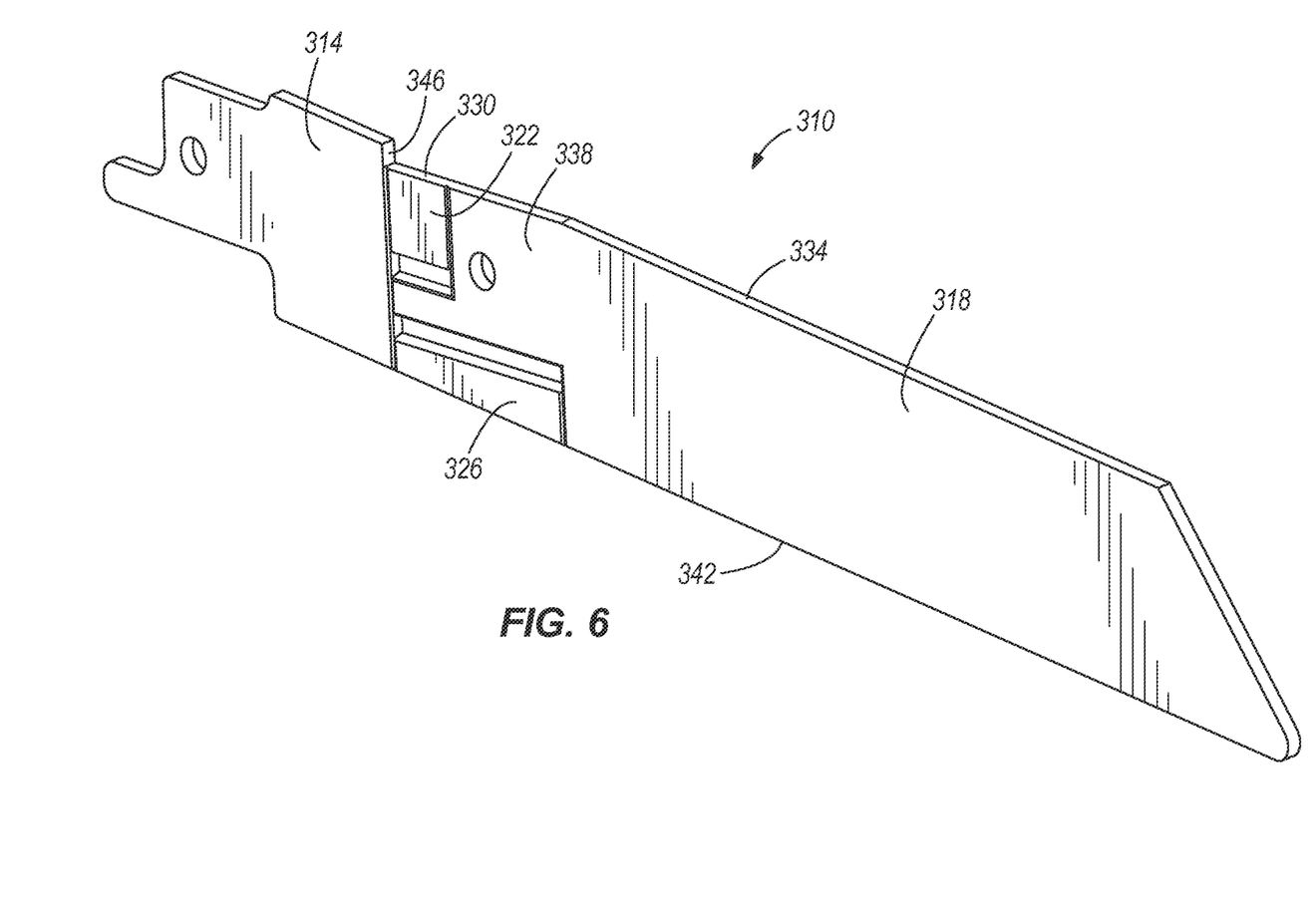
FIG. 6 is a perspective view of a saw blade according to yet another embodiment of the invention.
Figure 7:
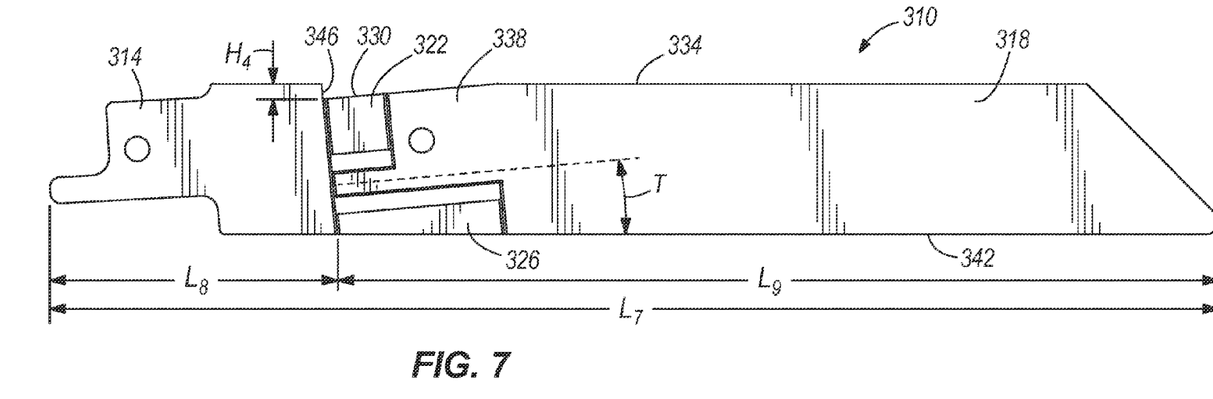
FIG. 7 is a side view of the saw blade shown in FIG. 6.
Figure 8:
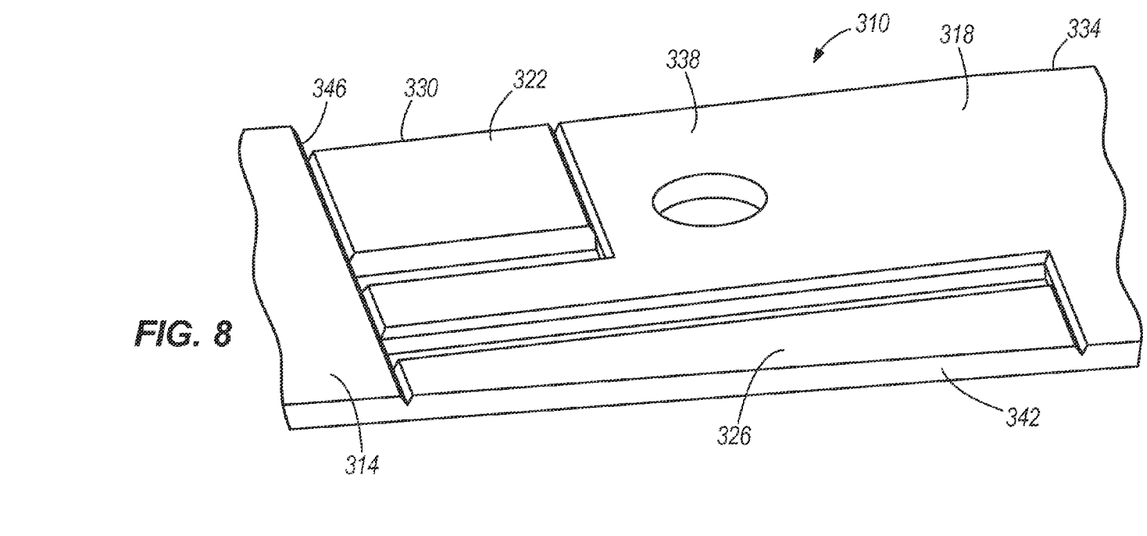
FIG. 8 is an enlarged view of a portion of the saw blade shown in FIG. 6.

FIGS. 6-8 illustrate yet another embodiment of a saw blade 310 for use with a reciprocating saw. The illustrated saw blade 310 is similar to the saw blades 10, 210 discussed above and includes two saw blade sections 314, 318 connected together by connecting members 322, 326. Similar to the saw blade 210 shown in FIG. 5, the illustrated saw blade 310 only includes two connecting members 322, 326 extending between and connecting the saw blade sections 314, 318. However, an edge 330 of the first connecting member 322 is angled relative to a back edge 334 of the saw blade 310. The first connecting member 322 follows the orientation of an attachment portion 338 of the second saw blade section 318, which is angled at a tang angle T relative to a cutting edge 342 of the saw blade 310. In some embodiments, the tang angle T may be, for example, approximately 5 degrees. The edge 330 of the first connecting member 322 thereby creates a lip or shoulder 346 between the first connecting member 322 and the first saw blade section 314. In the illustrated embodiment, the shoulder 346 has a height $H_4$ of approximately 0.07 inches. In other embodiments, the tang angle T may be relatively larger or smaller to increase or decrease the height $H_4$ of the shoulder 346.

Referring to FIG. 7, the saw blade 310 has an overall length $L_7$ measured generally parallel to the cutting edge 342, and each saw blade section 314, 318 has a length $L_8$, $L_9$ measured generally parallel to the cutting edge 342. In the illustrated embodiment, the overall length $L_7$ of the saw blade 310 is approximately 6 inches and the length $L_8$ of the first saw blade section 314 is approximately 1.45 inches such that the length $L_8$ of the first saw blade section 314 is approximately 25% of the overall length $L_7$ of the saw blade 310. In other embodiments, the overall length $L_7$ of the saw blade 310 may be increased or decreased, while the length $L_8$ of the first saw blade section 314 remains constant (e.g., 1.45 inches). In such embodiments, the ratio of the length $L_8$ to the overall length $L_7$ may vary. In further embodiments, the length $L_8$ of the first saw blade section 314 may be relatively longer or shorter.

Figure 9:
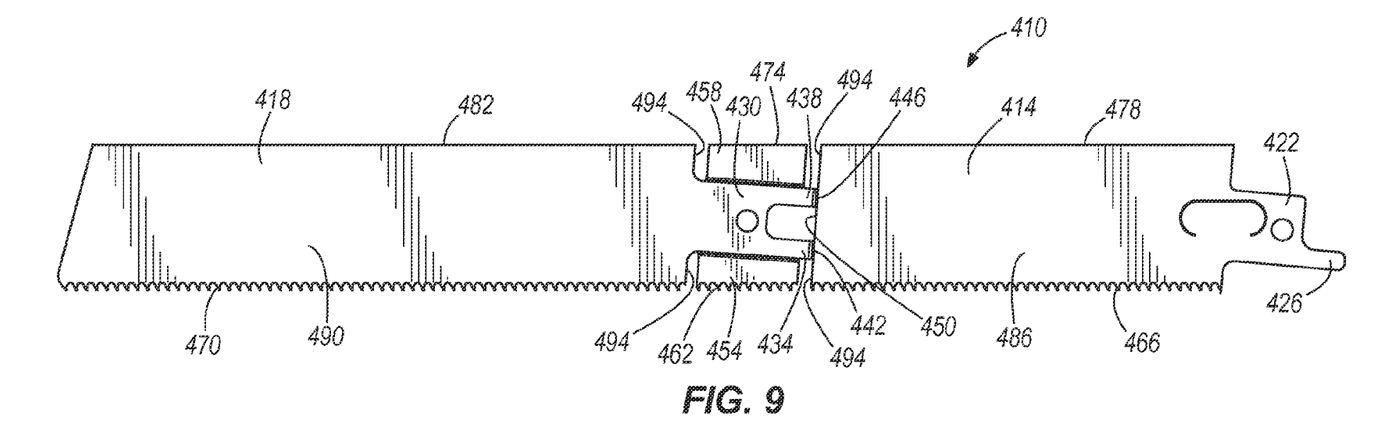
FIG. 9 is a side view of a saw blade according to still another embodiment of the invention.

FIG. 9 illustrates still another embodiment of a saw blade 410 for use with a reciprocating saw. The illustrated saw blade 410 is similar to the saw blades 10, 210, 310 discussed above and includes two saw blade sections 414, 418 that are connected together. In the illustrated embodiment, the first saw blade section 414 includes an attachment portion 422 having a single tang 426, while the second saw blade section 418 includes an attachment portion 430 having a double tang (i.e., a first tang 434 and a second tang 438 that is spaced apart from the first tang 434). Ends 442, 446 of both the first and second tangs 434, 438 engage an end portion 450 of the first saw blade section 414 to connect the second saw blade section 418 to the first saw blade section 414.

The saw blade 410 also includes two connecting members 454, 458 coupled to the attachment portion 430 of the second saw blade section 418. The first connecting member 454 is connected to the attachment portion 430 adjacent the first tang 434 to provide support to the first tang 434. The first connecting member 454 includes cutting teeth 462 that are generally inline with cutting teeth 466, 470 of the first and second saw blade sections 414, 418. The second connecting member 458 is connected to the attachment portion 430 adjacent the second tang 438 to provide support to the second tang 438. The second connecting member 458 has a back edge 474 that is generally inline with back edges 478, 482 of the first and second saw blade sections 414, 418. The connecting members 454, 458 are spaced apart from bodies 486, 490 of the first and second saw blade sections 414, 418 by vertically-oriented slots 494. When the second saw blade section 418 is separated from the first saw blade section 414, the connecting members 454, 458 are also removed (e.g., snapped off) such that the attachment portion 430 is suitably configured for connection to a reciprocating saw.

Figure 10:
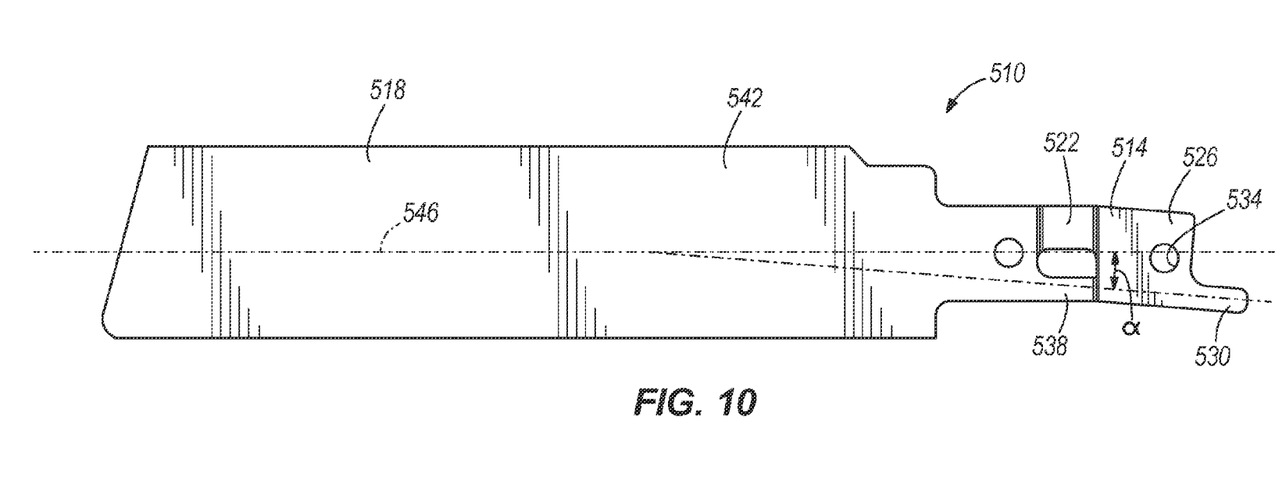
FIG. 10 is a side view of a saw blade according to yet still another embodiment of the invention.

FIG. 10 illustrates yet still another embodiment of a saw blade 510 for use with a reciprocating saw. The illustrated saw blade 510 is similar to the saw blades 10, 210, 310, 410 discussed above and includes two saw blade sections 514, 518 connected together by a connecting member 522. In the illustrated embodiment, the first saw blade section 514 is comprised solely of an attachment portion 526 having a tang 530 and an aperture 534. Unlike the previously-described saw blades 10, 210, 310, 410, the first section 514 does not include a body or a cutting portion.

As shown in FIG. 10, the tang 530 of the first saw blade section 514 and a tang 538 of the second saw blade section 518 are oriented at different angles relative to a body 542 of the second saw blade section 518. For example, the tang 530 of the first saw blade section 514 is oriented at a first angle α relative to a longitudinal axis 546 of the body 542. The tang 538 of the second saw blade section 518 is oriented at a second angle relative to the longitudinal axis 546 of the body 542. The second angle, however, is generally parallel to the longitudinal axis 546 and is not labeled in the drawing. The second saw blade section 518 can therefore be separated from the first saw blade section 514 to change the tang angle of the saw blade 510.

Although the invention has been described with reference to certain preferred embodiments, variations and modifications exist within the scope and spirit of one or more independent aspects of the invention. For example, although each of the saw blades 10, 210, 310, 410, 510 has been shown and described as including two saw blade sections, in other embodiments, each saw blade 10, 210, 310, 410, 510 may include three or more saw blade sections that are connected together. In addition, features of one saw blade may be used in combination with one or more features of another saw blade Various features and advantages of the invention are set forth in the following claims.

The invention claimed is:

1. A saw blade for use with a reciprocating saw, the saw blade comprising:

a first section including a body, a cutting portion formed on the body, and an attachment portion configured to engage the reciprocating saw;

a second section including a body, a cutting portion formed on the body, and an attachment portion configured to engage the reciprocating saw; and a connecting member coupling the first section to the second section so that the first and second sections are usable together with the reciprocating saw as a single saw blade;

wherein the second section is disconnectable from the connecting member to separate the second section from the first section such that the second section is usable with the reciprocating saw independently of the first section;

wherein the connecting member extends between the body of the first section and the body of the second section; and wherein the connecting member is spaced apart from the attachment portion of the second section to define an opening therebetween.

2. The saw blade of claim 1, wherein the attachment portion of the first section is configured to engage the reciprocating saw when the first and second sections are usable together as the single saw blade, and wherein the attachment portion of the second section is configured to engage the reciprocating saw when the second section is disconnected from the connecting member.

3. The saw blade of claim 1, wherein the connecting member extends between the body of the first section and the attachment portion of the second section.

4. The saw blade of claim 1, wherein the connecting member is a first connecting member, and further comprising a second connecting member that is spaced apart from the first connecting member and that couples the first section to the second section, wherein the second section is also disconnectable from the second connecting member to separate the second section from the first section.

5. The saw blade of claim 4, further comprising a third connecting member that is spaced apart from the first and second connecting members and that couples the first section to the second section, wherein the second section is also disconnectable from the third connecting member to separate the second section from the first section.

6. The saw blade of claim 5, wherein the second connecting member extends between the body of the first section and the body of the second section, and wherein the third connecting member extends between the body of the first section and the attachment portion of the second section.

7. The saw blade of claim 1, wherein the attachment portion of the second section is directly connected to the first section when the first and second sections are usable together, and wherein the attachment portion of the second section is disconnectable from the first section to separate the first and second sections.

8. The saw blade of claim 1, wherein the connecting member includes a cutting portion.

9. The saw blade of claim 8, wherein the cutting portions of the first section, the second section, and the connecting member are generally aligned to form a continuous cutting edge.

10. A method of using a saw blade with a reciprocating saw, the method comprising:

providing a saw blade including a first section and a second section, the first section having a first body with a first cutting portion and an attachment portion, the second section having a second body coupled to the first section, a second cutting portion formed on the second body, and an attachment portion;

providing a connecting member that couples the first section to the second section so that the first and second sections are usable together as the single saw blade;

connecting the attachment portion of the first section to the reciprocating saw to use the first and second sections together as a single saw blade;

disconnecting the attachment portion of the first section from the reciprocating saw;

separating the second section from the first section;

disconnecting the second section from the connecting member; and connecting the attachment portion of the second section to the reciprocating saw to use the second section independently of the first section;

wherein separating the second section from the first section includes snapping the second section apart from the first section without using tools.

11. The method of claim 10, wherein the attachment portion of the second section includes a tang and an aperture, wherein the tang of the second section is directly coupled to the first section, and further comprising disconnecting the tang of the second section from the first section.

12. A saw blade for use with a reciprocating saw, the saw blade comprising:

a first section including a body, a cutting portion formed on the body, and an attachment portion configured to engage the reciprocating saw;

a second section including a body, a cutting portion formed on the body, and an attachment portion configured to engage the reciprocating saw; and a connecting member coupling the first section to the second section so that the first and second sections are usable together with the reciprocating saw as a single saw blade; and wherein the second section is disconnectable from the connecting member to separate the second section from the first section such that the second section is usable with the reciprocating saw independently of the first section;

wherein the connecting member is a first connecting member, and further comprising a second connecting member that is spaced apart from the first connecting member and that couples the first section to the second section, wherein the second section is also disconnectable from the second connecting member to separate the second section from the first section;

further comprising a third connecting member that is spaced apart from the first and second connecting members and that couples the first section to the second section, wherein the second section is also disconnectable from the third connecting member to separate the second section from the first section;

wherein the first connecting member extends between the body of the first section and the body of the second section, wherein the second connecting member extends between the body of the first section and the body of the second section, and wherein the third connecting member extends between the body of the first section and the attachment portion of the second section.

* * * * *